United States Patent [19]

Anderson

[11] 4,046,541

[45] Sept. 6, 1977

[54] SLAG QUENCHING METHOD FOR PYROLYSIS FURNACES

[75] Inventor: John Erling Anderson, Katonah, N.Y.

[73] Assignee: Union Carbide Corporation, New York, N.Y.

[21] Appl. No.: 690,184

[22] Filed: May 26, 1976

[51] Int. Cl.² ............................................. C03B 37/00
[52] U.S. Cl. .......................................... 65/19; 48/111; 65/141; 75/24; 110/171; 122/235 N; 266/287
[58] Field of Search ................. 48/111, 209; 75/65 R, 75/24, 30; 266/201, 195, 287; 65/19, 20, 141; 110/171; 122/235 N; 241/17

[56] References Cited

U.S. PATENT DOCUMENTS

| 3,729,298 | 4/1973 | Anderson | 48/111 |
| 3,741,136 | 6/1973 | Stookey | 122/235 N X |

FOREIGN PATENT DOCUMENTS

| 75,314 | 1/1919 | Austria | 65/141 |
| 602,986 | 6/1948 | United Kingdom | 65/19 |

Primary Examiner—Robert L. Lindsay, Jr.
Attorney, Agent, or Firm—Lawrence G. Kastriner

[57] ABSTRACT

A process for quenching molten residue discharged from a furnace hearth, through a non-submerged tap-hole, including the steps of: (a) providing a vertical slag duct in sealed communication at the top with the tap-hole and sealed at the bottom by being immersed a substantial distance into water in a quench tank, (b) flowing the molten residue from the hearth by gravity down the central axis of said slag duct and quenching it in the water contained in the submerged portion of the slag duct, said water being at a temperature sufficiently high to prevent slag explosions, wherein the improvement comprises:

substantially reducing cooling of the tap and hearth areas of said furnace by removing hot fluid from said duct and replacing same with cooler fluid, thereby substantially preventing steam generated by quenching of said molten residue in the water contained in the submerged portion of said duct from entering said tap and hearth areas.

13 Claims, 4 Drawing Figures

SLAG QUENCHING METHOD FOR PYROLYSIS FURNACES

BACKGROUND

This invention relates to quenching of molten slag discharged from a furnace, and particularly to the molten residue discharged from a solid waste disposal furnace having a non-submerged taphole of the type disclosed in U.S. Pat. No. 3,729,298.

Over the past decade, much emphasis has been placed on developing processes for the efficient disposition of solid waste to obviate the problems and difficulties of conventional waste disposal methods. The two most widely employed waste disposal methods have been landfilling and incineration. Landfilling operations have been found to be an ephemeral solution to the problem, since not only are available landfill areas becoming rapidly depleted, but the use of waste as landfill has contributed to the contamination of underground water creating possible health hazards. The alternative waste disposal technique, incineration, normally results in objectional air pollution. Moreover, since large gas volumes, stemming from the use of air as the combustion supporting gas would need to be treated, removal of pollutants is unduly expensive.

One process developed to circumvent the aforementioned problems of these conventional disposal methods is described in U.S. Pat. No. 3,729,298 — Anderson, "Solid Refuse Disposal Process and Apparatus." This patent discloses a process referred to herein as the Anderson process for disposing of refuse while simultaneously producing a useful gaseous product and an inert solid residue, comprising the steps of (a) feeding refuse into the top portion of a vertical shaft furnace, (b) feeding an oxygen containing gas into the base of said furnace, (c) pyrolyzing the organic portion of the refuse, (d) fluidizing the inorganic portion of the refuse, (e) discharging the gaseous products from the top of said furnace, and (f) tapping the molten residue, i.e. the fluidized inorganic material from the base of said furnace.

In U.S. Pat. No. 3,806,335 — entitled, "Process for Preventing Solidification in Refuse Converter Taphole," Anderson described a process for continuously withdrawing the molten residue, comprising slag and molten metal formed in the hearth of a refuse converter. This disclosure discloses a method for ensuring that the molten residue formed by the waste disposal process is maintained in a molten condition in the hearth, and additionally that the taphole is kept sufficiently hot to permit the molten slag to form from the hearth into a collection vessel without solidifying.

The refuse disposal process of U.S. Pat. No. 3,729,298 operates preferably at super-atmosphere pressure in the shaft furnace. U.S. Pat. No. 3,806,335 alludes to the problems related to maintaining the taphole open in furnaces operating under such a positive pressure condition. Whereas, this difficulty may be mitigated by operating the taphole in a submerged condition, U.S. Pat. No. 3,806,335 discusses why such a mode of operation is impractical. More precisely, because the refuse composition and, accordingly, the amount of molten residue produced fluctuates, it is difficult as well as impractical to ensure that the molten material always covers the taphole opening. Therefore, operation with a submerged taphole cannot be depended upon to successfully maintain the hearth sealed from the atmosphere.

Because of the evident problems in operating a taphole in a submerged condition, it has been suggested by Anderson in U.S. Pat. No. 3,720,298 as well as in U.S. Pat. No. 3,741,136 to Stookey, that the taphole be operated in a non-submerged condition, and that it be suitably enclosed to prevent the hearth from communicating directly with the surrounding atmosphere. This was done by linking the taphole to the water quench bath by a slag chute or duct. By suspending the slag duct into the water bath, a liquid seal is formed, preventing the hot gases within the hearth from flowing to the surrounding atmosphere.

The water bath also provides a suitable means for quenching the hot molten residue flowing from the hearth. Quenching the slag causes it to break into small granules, resulting from the rapid cooling of the molten slag from 2500° F to a solid residue at about 200° F. When the slag is granulated in this manner, the particles are typically small and brittle varying between 1/16 and ¼ of an inch in size. This granulated slag is generally transported from the quench basin by a conveyor for subsequent use, for example, as a landfill.

In the above-described process employing a water bath for quenching of the molten residue, it is essential to quench in hot water in order to prevent slag explosions. Unfortunately, however, while the use of an enclosed slag duct and a hot water quench bath solves one problem it creates another. It has been found that if used in a solid waste disposal process such as the earlier mentioned Anderson process, cooling of the hot molten residue in the water bath generates a considerable amount of steam which exerts a substantial cooling effect on the tap and hearth area. This cooling effect raises the viscosity of the slag and may cause plugging of the taphole. The seriousness of the tap and hearth cooling problem can be appreciated better when one considers that one pound of slag when quenched in water at 212° F will vaporize about one pound of steam. If this steam is allowed to enter the slag tap, which is at a temperature of about 3000° F, it will require about 1,600 BTU to heat the pound of steam from 212° F to 3000° F. Failure to add this extra heat to the hearth will cause it to cool rapidly, particularly in the slag tap causing the slag to freeze in the tap.

OBJECTS

It is an object of this invention therefore to provide an improved process for quenching molten residue discharged from a furnace hearth through a non-submerged taphole which is in direct communication with a normally steam producing quench bath.

It is another object of this invention to provide a process for quenching of molten residue discharged from a non-submerged taphole of a slagging solid waste disposal furnace using a hot water bath for quenching the molten residue whereby freezing of the taphole by the steam is substantially prevented.

DRAWINGS

SUMMARY

The above and other objects which will be apparent to those skilled in the art are achieved by the present invention which comprises:

in a process for quenching molten residue discharged from a furnace hearth, through a non-submerged taphole, including the steps of: (a) providing a vertical slag duct communicating in a sealed manner at the top thereof with said taphole, and sealed at the bottom by being immersed a substantial distance into water in a quench tank, (b) flowing the molten residue from the hearth by gravity to and then down the central axis of said slag duct and quenching said residue in the water contained in the submerged portion of said slag duct, said water being at a temperature sufficiently high to prevent slag explosions, the improvement comprising:

substantially reducing cooling of the tap and hearth areas of said furnace by (1) removing the hot fluid from said duct generated by quenching of said molten residue in the water contained in the submerged portion of said duct and (2) replacing said hot fluid with cooler fluid, thereby substantially preventing steam from entering said tap and hearth areas.

The term, fluid as used in the present specification and claim is meant to include both the gaseous and the liquid states. Hence, said term is intended to cover steam as well as water.

While the process of the present invention may be practiced so as to either withdraw the steam formed in the duct or displace the hot water in the submerged portion of the duct, the combination of the two may also be practiced.

In another aspect of the invention, means are provided for preventing adherence of molten residue to the inside surface of the vertical slag duct.

DETAILED DESCRIPTION OF THE INVENTION

This invention is particularly useful for quenching slag produced by operation of a refuse disposal process of the type disclosed in U.S. Pat. No. 3,729,298 wherein as much as 350 tons per day of refuse, may be processed producing up to four tons per hour of molten slag.

Figure 1:
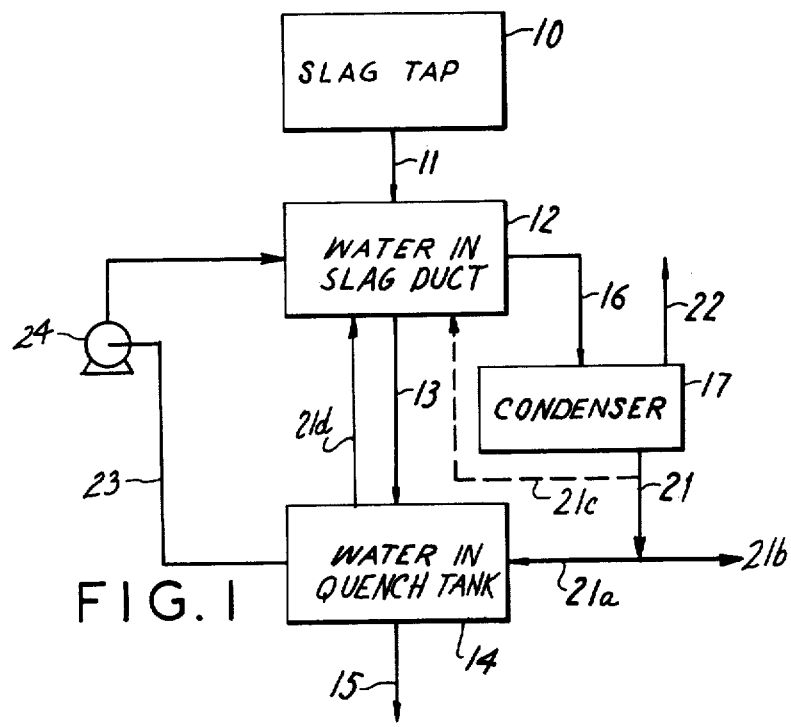
FIG. 1 is a block diagram of a slag quenching process carried out in accordance with this invention.

The process of this invention wherein the cooling effects of steam are minimized will now be described with reference to FIG. 1, which shows a block diagram of a slag quenching operation using a hot water quench bath. The quench bath is at a temperature sufficiently hot to prevent slag explosion, i.e. about 150° F and preferably above 180° F but no higher than the boiling point of the water in the slag duct or water seal area 12. The reference numeral 10 indicates the slag tap of a shaft furnace such as in a solid waste disposal unit. Slag flows from the slag tap 10, down through a vertical slag duct 11 into the quenching water located within the slag duct 12, whereby steam will be generated which if not removed promptly or prevented from being generated would rise and enter the tap and hearth area through the duct 11 and there exert a substantial cooling effect thereon. Such cooling effect is very detrimental in raising the viscosity of the slag and in some cases freezing it so as to plug the taphole and causing shut down of the furnace. Thus, in order to minimize such cooling, the major portion of the steam generated by the water 12 in the vertical slag duct 11 is withdrawn via conduit 16 into a condenser 17. The condensed steam, along with any other condensible gases, is withdrawn in conduit 21, while the non-condensible gases present in line 16 are withdrawn from the condenser via line 22. The solidified slag falls through the submerged portion of the slag duct, referenced by line 13, and drops to the bottom of the water bath quenching tank 14. This slag 15 is then withdrawn from quench bath 14 by any suitable means, such as a drag or screw conveyor. The condensate 21 may be recycled as shown by line 21a to the quench tank 14 or fed directly to the slag duct 12 via line 21c. Excess condensate beyond that needed to cool the quench bath may be discarded via line 21b. Cooling water fed into tank 14 through line 21a will in turn replenish 21d the water 12 in the slag duct which evaporates as steam.

An alternative to withdrawing the steam formed in the slag duct 11 from water 12 is to prevent the steam from forming in the first place. This may be achieved by recirculating the cooler water in the quench tank 14 into the water in slag duct 12 through line 23 by means of a pump 24. The recirculation of the water must be adequate to remove the heat from water 12 as fast as the heat input caused by the hot slag quenched therein. A combination of the two systems, i.e. recirculation and steam withdrawal may also be used to prevent steam from rising in the slag duct and cooling the tap and hearth areas.

By operating in the above-described manner, there is provided a process for efficient continuous quenching of slag while concurrently preventing both the hot gases in the hearth from escaping to the surrounding atmosphere while preventing the steam generated by the quenching operation from entering and cooling the tap and hearth areas. By preventing steam from getting back to the tap and hearth in accordance with the present invention, a considerable amount of energy is conserved. Only by heating the steam (at 212° F) up to the temperature of the hearth (3000° F) by use of additional heat input can the undesirable cooling effects of the steam on the tap and hearth be avoided.

Figure 2:
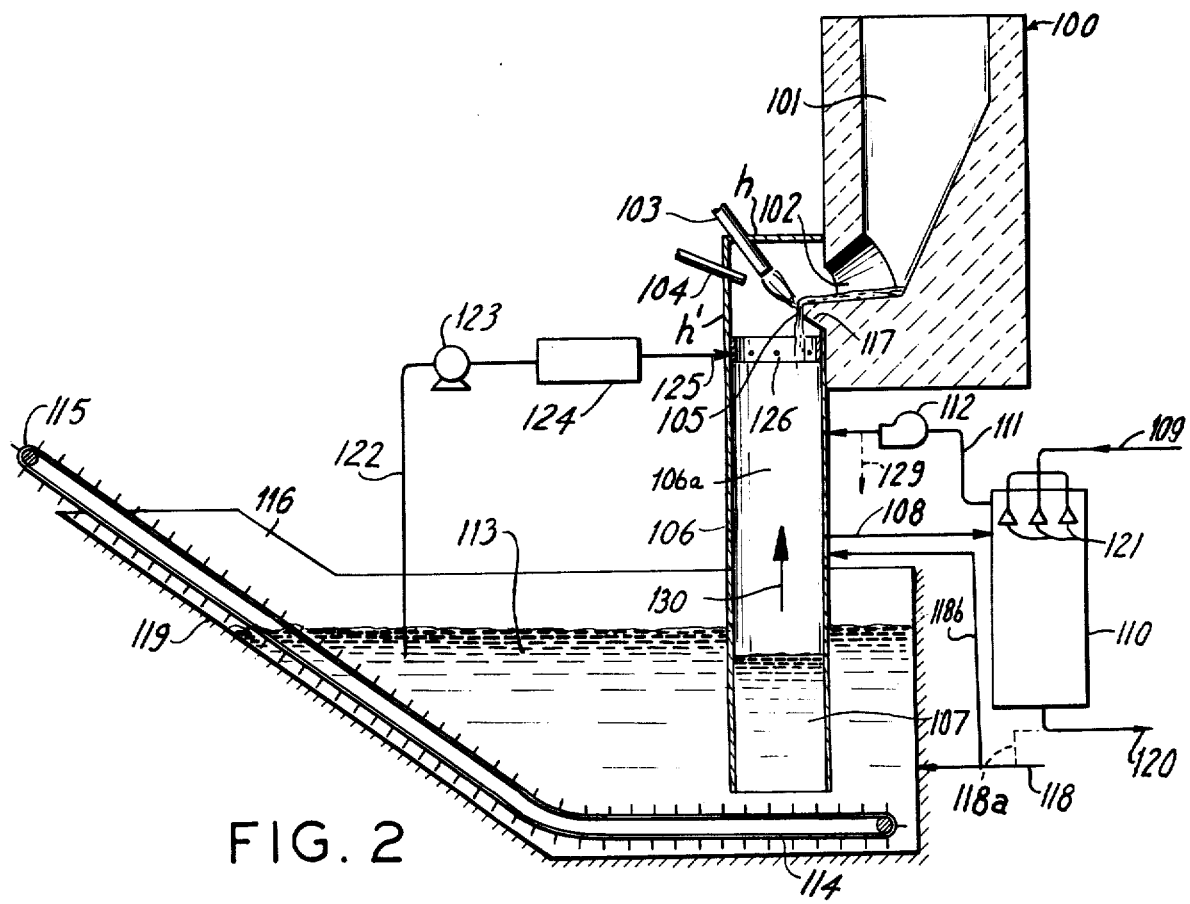
FIG. 2 is a diagrammatic view partially in cross-section of apparatus for carrying out one embodiment of the process of this invention wherein means are provided for withdrawing steam from the slag duct and condensing same.
Figure 3:
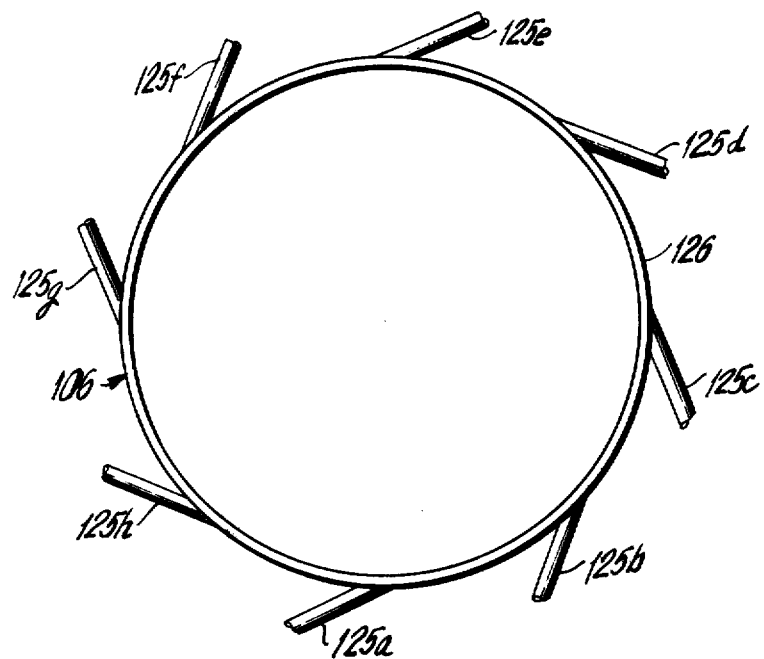
FIG. 3 is a plan view of the water spray means for preventing the adherence of molten residue to the inner surface of the vertical slag duct used in the process illustrated in FIG. 2.

A still further aspect of this invention is the provision of a water spray ring arrangement for preventing the adherence of the molten metal to the vertical inside walls of the slag duct illustrated in FIG. 2 and FIG. 3.

In order to describe the invention in more detail, reference will now be made to FIGS. 2-4. In the arrangement shown in FIG. 2 there is shown the base of a shaft furnace 100 having a continuous non-submerged slag tap 102. The furnace is a solid waste disposal unit, of the type described in U.S. Pat. Nos. 3,801,082 and 3,806,335. Non-combustible materials melt in the hearth area 101 and the resulting molten residue 105 flows out through the taphole 102 and over a pouring lip 117. The molten residue 105 falls through a substantially vertical slag duct 106 into the water quench bath 113. The slag duct 106 is sealed from the atmosphere at the top by housing means h, h', and at the base by immersion of a substantial vertical extent into the water bath 113, thereby forming a liquid seal. The volume of water 107 is the portion of the quench bath into which the hot molten slag 117 falls, which must be kept at a temperature above about 150° F to prevent slag explosion, and which generates the steam which must be prevented from getting back up into the taphole 102 and hearth 101 to prevent freezing the taphole and causing operational upsets in the furnace. To help insure a burner 103 an auxiliary oxygen supply 104, may be used, substantially as described in U.S. Pat. No. 3,806,335. The molten residue 105, which drops through the slag duct 106, falls into the volume of water within the duct of the quench bath 113. The water 113 will normally be considerably cooler than 107. The slag chute 106 is immersed to a sufficient depth in the quench bath 113, not only to ensure that pressure fluctuations in the pyrolysis furnace 100 do not destroy the water seal at the base of duct 106 but, furthermore, to ensure that the steam generated by the rapid quenching of the molten residue in water 107 in primarily restricted to the head space 106a of duct 106. The solid residue descends through the water 107 in duct 106 falling on to the drag conveyor 114. The drag conveyor 114 transports this solid residue (not shown) to a discharge point 115. 116 represents a safety cover over the quench tank. The discharge end 119 of the quench bath 113 is inclined upward to allow the drag conveyor to rest on the floor of the tank.

Steam indicated by arrow 130 generated during the quenching operation, along with other gases present in the duct, is withdrawn from duct heat space 106a through conduit 108. This steam is thereafter condensed in, for example, a spray condenser 110 by a water spray delivered through conduit 109 and nozzles 121. The condensed fraction is pumped from spray condenser 110 through conduit 120. The stream of non-condensed gases are returned to duct 106 via conduit 111 by blower 112. Make-up water to replace the water lost as steam and for cooling the quench bath 113 can be added directly into the quench basin 113 through line 118. Such make-up water can originate from any convenient source, for instance, a fraction of the condensed liquid stream 118a may be diverted to conduit 118 for use as make-up liquid or it can be added into the slag duct 106 through line 118b. Additionally, the non-combustible gases need not be returned to the slag duct, but may be directly discarded through line 129, subsequent to any required clean-up.

Another highly advantageous result afforded by the present process is that only a small amount of non-condensible gases are removed with the steam from the duct. In fact, the non-condensible constituents withdrawn from the duct constitute only about 2% of the total steam gas flow. Therefore, these gases can be safely and efficiently disposed of by simply injecting them back into the slag duct 106 as shown in FIG. 2. As a result of the extremely small quantity of these gases, they have practically no cooling effect on the tap and hearth areas.

In the arrangement illustrated in FIG. 2, there is provided means for preventing molten residue from adhering to the inner walls of the slag duct 106. As a result of fluctuations in both the rate of molten residue production, as well as in the slag/metal composition of the residue issuing from the hearth 101, the molten material overflowing the refractory lip 117 may occasionally contact the metal wall of the slag duct 106. Upon contact, this molten residue tends to adhere to the metallic wall by forming a weak weld or a mechanical bond at sites of imperfections in the duct wall. For example, a bolt protruding from the inner wall of the duct may act as an anchor for the molten residue. Once some slag or metal solidifies on the wall, it is easier for additional slag or metal or solidify thereon, thereby forming a clinker. This clinker, in some instances, may break loose under its own weight, although there are many cases when it will not. In such cases, the clinker may continue to grow until the entire slag duct becomes sealed. Such blockage may necessitate a complete and expensive process shut down to remedy the situation.

As shown in FIG. 2, the molten residue may be prevented from adhering to the inner walls of the slag duct 106 by pumping water from any convenient source, such as the quench tank 113, to a spray ring 126. Water is pumped via conduit 122 by a pump 123 through heat exchanger 124. The water is preferably heated to at least 180° F if necessary in order to prevent slag explosion which may be caused if the water spray is too cold when it contacts the hot slag. The water then flows by conduit 125 to spray ring 126.

FIG. 3 shows a plan view of one embodiment of a spray ring. Water flowing through the conduit 125 enters the slag duct 106 via tangentially arranged water nozzles 125a through 125h. These tangential water injectors form a thin film of water along the inner wall of the duct. In this way, all portions of the duct below the tangential water injection ring are wetted with a moving film of water. This water film prevents the molten material from adhering to the duct wall. Any water spray or nozzle arrangement which forms a lamina of water on the inner wall of the duct will perform the requisite function. While not so shown in the drawing a ring of spray nozzles directed to spray water toward the axis of the duct 106 may also be employed if desired. Such a spray of water may be used to quench the stream of slag as it falls through the duct. Such spray quenching may be used in conjunction with the quench bath.

Another embodiment of the present invention is the provision in the water quenching operations of means for reducing or substantially eliminating the steam generated in the duct when the molten residue is quenched by the water bath. As shown in FIG. 4, molten residue drops through the vertical slag duct 206 into the volume of water 207 contained in the submerged portion of said duct. Typically, the temperature of the water in the duct 207 will rise as a result of contacting the hot molten residue. As a result of the continuous flow of molten residue, one would expect the water in this area to be boiling, the only cooling effects being convective currents from below the duct, conduction through the duct walls and evaporation of water into the head space 209 of the duct. To counteract this attendant temperature rise and generation of steam, there is provided a means for cooling water 207. A pump 221 recirculates cooler water through line 222 from quench bath 213, i.e. the water outside the duct into the hot water 207. By appropriately controlling the pump recirculating rate and the temperature of the quench bath 213, the water volume 207 in the duct can be maintained at the desired temperature. This being above 150° F and preferably above 180° F but below the boiling point of the water 207. It is to be noted that the boiling point of the water in the duct is not necessarily 212° F, but slightly higher because it is under several inches of pressure.

Figure 4:
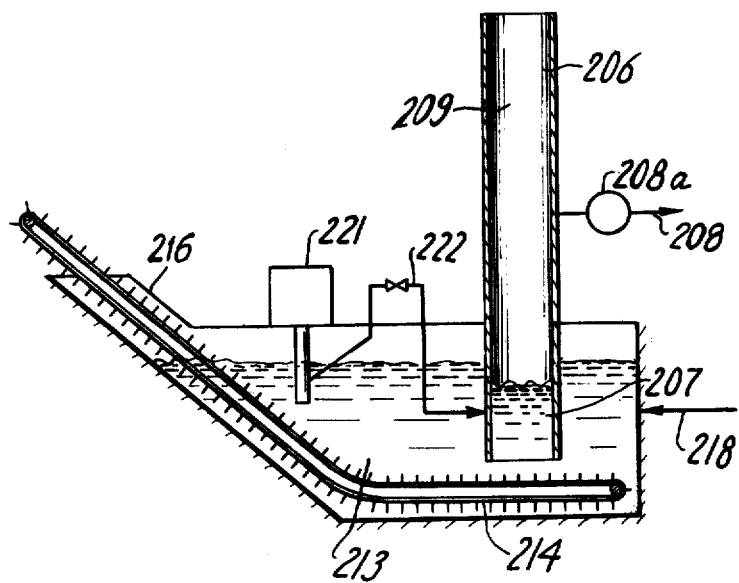
FIG. 4 is a diagrammatic view of apparatus for carrying out another embodiment of the process in accordance with this invention wherein means are provided for reducing the amount of steam generated by quenching of the molten residue in the water bath by recirculating water from the quench tank into the slag duct.

As in the system shown in FIG. 2, in the system illustrated in FIG. 4, the molten residue contacts the water bath 207 and granulates into small particles. These particles descent through the open base of duct 206 falling onto drag conveyor 214 which transports the quenched solid residue (not shown) out of the quench bath 213. A safety cover 216 is provided. Cooling make-up liquid is added to the bath via conduit 218. In the event that all generation of steam in duct head space 209 is not prevented either by choice or due to the inability of the recirculation system to provide sufficient cooling of water 207, any steam generated may be withdrawn through line 208. Line 208 is located in the lower portion of the duct head space 209 to insure capturing the steam before it gets back up into the tap and hearth areas of the furnace (not shown). A blower 208a provides suction to withdraw the steam from the duct 206.

What is claimed is:

1. In a process for quenching molten residue discharged from a furnace hearth, through a non-submerged taphole, including the steps of: (a) providing a vertical slag duct communicating in a sealed manner at the top thereof with said taphole, and sealed at the bottom by being immersed a substantial distance into water in a quench tank, (b) flowing the molten residue from the hearth by gravity to and then down the central axis of said slag duct and quenching said residue in the water contained in the submerged portion of said slag duct, said water being at a temperature sufficiently high to prevent slag explosions, the improvement comprising:

substantially reducing cooling of the tap and hearth areas of said furnace by (1) removing sufficient hot fluid from said duct generated by quenching of said molten residue in the water contained in the submerged portion of said duct and (2) replacing said removed hot fluid with cooler water, thereby maintaining the temperature of the water in said duct between about 150° F and the boiling point of the water and substantially preventing steam from entering said tap and hearth areas.

2. A process as in claim 1 wherein said hot fluid is hot water.

3. A process as in claim 1 wherein said hot fluid is steam.

4. A process as in claim 2 wherein the hot water is removed by being displaced out the open bottom of said duct by introduction into said duct of cooler water from the quench tank outside said duct.

5. A process as in claim 3 wherein the steam is removed by being withdrawn from the lower head space portion of the slag duct.

6. A process as in claim 5 wherein the steam removed from said duct is condensed, and the condensate fed at least in part back into the quench bath.

7. A process as in claim 1 wherein adherence of molten residue to the inside wall of the vertical slag duct is prevented by wetting said wall with a thin film of flowing water.

8. A process as in claim 1 wherein said hot fluid consists of both hot water and steam.

9. A process as in claim 8 wherein the hot water is removed by being displaced out the open bottom of said duct by introduction into said duct of cooler water from the quench tank outside said duct and wherein the steam is removed by being withdrawn from the lower head space portion of the slag duct.

10. A process as in claim 8 wherein the hot water is removed by being displaced out the open bottom of said duct by introduction into said duct of cooler make-up water and wherein the steam is removed by being withdrawn from the lower head space portion of the slag duct.

11. A process as in claim 1 wherein the water contained in said submerged portion of said slag duct is maintained between 180° F and the boiling point of the water.

12. A process as in claim 9 wherein the water contained in said submerged portion of said slag duct is maintained between 180° F and the boiling point of the water.

13. A process as in claim 11 wherein adherence of molten residue to the inside wall of the vertical slag duct is prevented by wetting said wall with a thin film of flowing water.

* * * * *